UNITED STATES PATENT OFFICE.

ALBERT E. GREENE, OF CHICAGO, ILLINOIS.

PROCESS OF REDUCING ORES.

1,129,862.  Specification of Letters Patent.  Patented Mar. 2, 1915.

No Drawing.  Application filed July 15, 1912. Serial No. 709,466.

*To all whom it may concern:*

Be it known that I, ALBERT E. GREENE, citizen of the United States, residing at Chicago, in the county of Cook and State of Illinois, have invented a certain new and useful Improvement in Processes of Reducing Ores, of which the following is a full, clear, concise, and exact description.

My present invention relates to a continuous process of reducing ores and slagging impurities and is more particularly applicable to the direct production of refined iron, steel or ferro-alloys, such as ferro-manganese, from their ores.

As is well-known in the direct reduction of iron-ore to steel in an electric furnace by the use of a limited amount of solid reducing agent insufficient to carburize the reduced iron, the loss of iron oxid in the slag is very considerable. If in such a process lime is added with the charge, a considerable removal of phosphorus may be accomplished, but the loss of iron in the slag is nevertheless excessive.

It is one object of the present invention to accomplish the direct reduction of iron-ore and the slagging of an impurity like phosphorus without the loss of iron oxid in the slag.

The process of this invention provides a means of reducing oxid of iron without reducing the slag compound which holds the phosphorus and thereby differs from the present processes for slagging phosphorus by holding it in a slag practically free from iron oxid or other similar metallic oxids.

In the reduction of oxid ores, the temperature maintained and the nature of the reducing agents go to determine the equilibrium conditions between the several components of the charge. In my United States Patent, No. 1,034,788 dated Aug. 9, 1912, I have described a process of treating ore by which one oxid thereof may be reduced without reducing the oxid of an undesired element.

My present invention relates more particularly to an improved process of selectively reducing a given oxid from a mixture of oxids. I have found that in certain cases, an oxid which it is not desired to reduce with the metal may be rendered less likely to be reduced by causing it to combine with some other oxid for which it has strong affinity.

In certain cases the oxids of different elements have strong affinities for each other and combine to form double oxids or salts. These double oxids have definite tendencies to dissociate their oxygen, just as do the several component oxids which form the salts. This tendency of a double oxid or salt to dissociate oxygen depends, to a certain extent, on the temperature and also depends on the affinity between the component oxids, and in many cases the double oxid is more difficult to reduce than either of the separate oxid components. This is especially true when the two component oxids are of widely different chemical nature, as where one is basic, and the other acid, as, for example, are lime and silica, respectively.

One measure of the affinity between different oxids is the heat of formation of their double oxid or salt. Thus the heat of formation of calcium silicate from its component oxids is represented as follows:

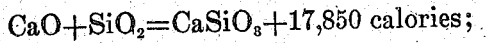

the heat of formation of calcium phosphate,

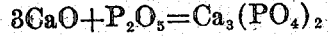

is 159,400 calories. In other words, the affinity of phosphoric oxid for lime is greater than that of silica for lime. The heat of formation of iron silicate,

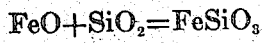

is 8,900 calories.

This invention in its application to the treatment of ores contemplates the preparation of the charge by adding to the ore a suitable oxid or fluxing agent having affinity for the oxid which it is desired not to reduce, thereby increasing the difficulty of reducing the latter, and it further contemplates the reduction of the desired metal by subjecting the charge to controlled temperature and reducing conditions suitable for reducing the oxid of the desired metal but unsuitable for reducing the double oxid formed by the fluxing agent and the undesired element.

In general the oxid or salt compound will contain an acid radical and a basic radical.

Thus calcium oxid (CaO) has a very strong affinity for phosphoric oxid ($P_2O_5$), the one being very basic and the other very acid, said oxids combining to form calcium phosphate $$3CaO + P_2O_5 = Ca_3(PO_4)_2.$$

In the presence of iron, it is much more difficult to reduce calcium phosphate than it is to reduce phosphoric oxid, though under strong reducing conditions phosphorus can be reduced from calcium phosphate. Thus with coke in an electric furnace calcium phosphate is readily reduced, whereas under the same temperature conditions ordinary producer gas will not so reduce it.

As illustrative of my invention, I will now describe its application to the direct reduction of high phosphorus iron-ore to steel and the simultaneous separation of phosphorus therefrom. The operation of the process may be carried out in a single furnace or in two separate furnaces in which latter case the charge is first brought to an elevated temperature and is then discharged into a finishing chamber in which the reduction and slagging of the impurities is completed. I prefer to carry out this process in a continuous manner, although it is to be understood that it may be carried out in any suitable type of furnace such as an arc furnace. Inasmuch as the preliminary heating of the charge need not be carried out under as strong a reducing agent as is required subsequently, I prefer to accomplish the preliminary heating by means of fuel combustion rather than electricity, especially where cheap fuel is available. The charge is made up of iron-ore, lime, or limestone, and some form of solid reducing agent, such as coal or coke. The proportion of lime is sufficient to make a basic slag with the phosphorus silica in the charge when practically no manganese or iron oxids remain in the slag. The proportion of carbon is kept sufficiently high so that the reduced metal will be carburized to the desired extent. Of course, steel of any per cent. carbon may be made by varying the content of carbon and it is desirable to accomplish as much reduction of the oxids by carbon as possible. During the preliminary heating of the ore charge, some reduction of the oxids is accomplished by the solid carbon. During the latter stage, a large amount of iron oxid is held combined with the phosphorus and lime as slag. By the action of a reducing gas forced through the charge under the high heat generated by electric arcs, or in any other suitable way, the iron oxid is practically completely reduced, leaving the phosphorus combined with the lime as calcium phosphate. The solid carbon is completely consumed by combining partly with oxygen of the ore and also by partly carburizing the metal. The essential feature of the latter stage of the process is the reduction of iron oxid without reduction of the slag compounds of phosphorus, and this is accomplished under the influence of the electric heat by means of the gaseous reducing agent. If an excess of solid carbon were used in the charge so that solid carbon would be present in the last stage of the process, the calcium phosphate would be reduced thereby. The reducing gas, however, is not reducing enough to break up the calcium phosphate and it is this control of the reducing conditions which makes it possible by the process of this invention to selectively reduce the iron oxid and at the same time slag the oxid of phosphorus. The reducing gas, which is forced through the ore charge under influence of electric heat, may be burnt subsequently and thereby serve to preheat the charge.

In case the phosphorus occurs in iron-ore in some other form than an oxid, it may be necessary to supply the blast with sufficient oxidizing components, such as $CO_2$, to enable the formation of calcium phosphate. In certain cases the use of limestone may supply sufficient $CO_2$ to accomplish this desired reaction.

By the use of the process of my present invention, low-carbon iron may be produced and the loss of iron-oxid in the slag may be practically prevented, and it is to be noted that the absence of iron-oxid from the slag makes certain refining reactions possible, such as the combination of sulfur with the lime, the sulfur thus separating from the metal and passing into the slag as calcium sulfid.

To give a further example, my invention may be applied to the reduction of manganese ore containing a large percentage of silica without reduction of the silica. As is well-known, the reduction of manganese ore in the blast furnace requires considerably more coke per ton of metal than is required to reduce a ton of pig iron. In the presence of an excess of solid reducing agent, and particularly at high temperatures, much silica is often reduced and the resultant manganese alloy is high in silicon. The use of an excess of lime to flux the silica renders the operation of the blast furnace very difficult because sufficiently high temperatures can not be maintained.

The process of the present invention enables the selective reduction of manganese from a silicious ore and the simultaneous slagging of silica without great excess of lime in the following very efficient and simple manner. Any suitable electrically heated furnace may be employed, such, for example, as an electric blast furnace. Lime is charged, together with the manganese ore, in proportion to form a fluid slag with the silica; the relative proportions of lime and silica in the charge should be about 3 parts of lime to 2 parts of silica. The preliminary or partial reduction may be assisted by charging a small portion of solid reducing agent in such amount as to be entirely consumed before the charge is completely reduced. The selective action is accomplished by using a reducing gas suitable for reducing the manganese oxid without reducing the calcium silicate slag. In general, such gas should be high in CO, hydrogen, or the like, and its reducing power controlled by oxidizing components such as carbon dioxid. The temperature in the reduction chamber is maintained preferably above 1500° C. Producer gas containing only 4% or 5% of $CO_2$ and 25% of CO is suitable for carrying out this process, and, under the above conditions, the silica is slagged with a comparatively small amount of lime. In the same manner phosphorus may be eliminated from manganese ore.

As another instance of its application, the process may be used for the separation of copper from iron in the reduction of oxid ores containing these metals. In this case, I prefer to use silica as the flux for the oxid of iron, and the gaseous reducing agent is controlled as described above for reducing manganese ore.

An additional feature of this invention, especially where large quantities of an undesired oxid are present in the material treated in accordance therewith, is the use of a fluxing agent which will produce a fluid slag, thereby greatly facilitating the operation of the furnace and the separation of the reduced metal and the oxidized impurity. It will be understood that the lime employed as a fluxing agent may be directly produced in the furnace from limestone.

What I claim is:

1. The process of reducing a metallic oxid from an ore containing it and also containing an undesirable impurity, said process consisting in subjecting the ore, at an elevated temperature and in the presence of a flux suitable for forming a molten oxid salt with the undesired impurity, to a gaseous agent having a selective reducing action on said metallic oxid, but which will not reduce said oxid salt.

2. The process of reducing ores containing phosphorus, which consists in adding a lime flux for combining with the oxid of phosphorus to form calcium phosphate, and subjecting the charge of ore at an elevated temperature to the action of gas suitable for reducing the metallic oxid without reduction of the slag compounds of phosphorus.

3. The process of smelting iron-ore containing phosphorus which consists in charging ore and lime into an electrically heated furnace, partially reducing the iron oxid with suitable reducing agent, then subjecting the partially reduced charge to a gas suitable for reducing iron oxid under influence of electric heat, but not capable of reducing phosphorus, and slagging the phosphorus as calcium phosphate.

4. The process of producing low-carbon metals, which consists in charging into a furnace oxid ore, a flux having strong affinity for an impurity of the ore and a limited amount of solid reducing agent insufficient to completely reduce the ore; raising the charge to a reducing temperature; and completing the reduction of the ore with a reducing gas unsuitable for effecting carburization of the reduced metal but having insufficient reducing action to reduce the slag compound of the impurity.

5. The process of reducing ores and separating undesired elements therefrom, which consists in charging ore and a fluxing agent having strong affinity for the oxid of the undesired element into a suitable furnace, maintaining this charge at an elevated temperature, and subjecting it meanwhile to the action of a gas containing reducing and oxidizing components in suitable proportions for reducing the desired metal without reduction of the impurity.

6. The process of reducing a metallic oxid and separating an undesired oxid associated therewith, which consists in forming a salt compound of the undesired oxid and a fluxing agent, subjecting the charge at an elevated temperature to the action of a refining gas having a stronger affinity for oxygen than the metal to be reduced, but whose affinity for oxygen is insufficient to reduce said salt compound.

7. The process of reducing a given oxid from a mixture of said oxid and an undesired oxid, which consists in rendering the undesired oxid more difficult to reduce by combining it as a slag compound with a fluxing agent for which it has strong affinity, and meanwhile subjecting the mixture at an elevated temperature to the action of a reducing gas having sufficient reducing action to reduce the given oxid without reduction of said slag compound.

8. The continuous process of producing a refined metal of basic chemical nature from an ore containing impurities of an acid nature, which consists in providing charges of ores, solid reducing agent and a basic fluxing agent having strong affinity for the acid impurity, regulating the amount of reducing agent to prevent undesired carburization in the reduced metal, raising the temperature of the charge, and finally subjecting it to the action of a reducing gas under an elevated temperature having a sufficient reducing action to reduce the metallic oxid without reducing the slag compound of the acid impurity.

9. In the production of steel, the process of reducing oxids containing phosphorus as an impurity, which consists in adding lime to form calcium phosphate with the oxid of phosphorus and then subjecting the charge, while maintained heated at an elevated temperature by means of electric heat, to the action of reducing gas suitable for reducing the metallic oxids of the charge without reducing the slag compounds of phosphorus.

In witness whereof, I hereunto subscribe my name this 11th day of July, A. D. 1912.

ALBERT E. GREENE.

Witnesses:
ALFRED H. MOORE,
McCLELLAND YOUNG.